United States Patent
Spector et al.

(10) Patent No.: US 10,013,552 B2
(45) Date of Patent: *Jul. 3, 2018

(54) PROTECTING CONTENT ON A MOBILE DEVICE FROM MINING

(71) Applicant: GOOGLE INC., Mountain View, CA (US)

(72) Inventors: Alfred Zalmon Spector, Pelham Manor, NY (US); David Petrou, Brooklyn, NY (US); Blaise Aguera-Arcas, Seattle, WA (US); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,802

(22) Filed: Jul. 3, 2017

(65) Prior Publication Data

US 2017/0357802 A1 Dec. 14, 2017

Related U.S. Application Data

(60) Division of application No. 15/379,094, filed on Dec. 14, 2016, now Pat. No. 9,836,597, which is a continuation of application No. 15/189,185, filed on Jun. 22, 2016, now Pat. No. 9,563,671, which is a division of application No. 14/570,496, filed on Dec. 15, 2014, now Pat. No. 9,401,000.

(60) Provisional application No. 62/061,240, filed on Oct. 8, 2014, provisional application No. 62/042,775, filed on Aug. 27, 2014.

(51) Int. Cl.
*G06F 21/54* (2013.01)
*G06T 1/60* (2006.01)
*G06F 21/62* (2013.01)
*G06F 17/30* (2006.01)

(52) U.S. Cl.
CPC ........ *G06F 21/54* (2013.01); *G06F 17/30539* (2013.01); *G06F 21/6218* (2013.01); *G06T 1/60* (2013.01)

(58) Field of Classification Search
CPC .......................... G06T 1/0021; G06T 1/0092
See application file for complete search history.

(56) References Cited

U.S. PATENT DOCUMENTS

2009/0158318 A1* 6/2009 Levy ..................... G06F 21/125
725/32

OTHER PUBLICATIONS

Robots exclusion standard, Wikipedia, the free encyclopedia, Nov. 14, 2012, https://en.wikipedia.org/w/index.php?title=Robots_exclusion_standard&oldid=559326675.*

(Continued)

*Primary Examiner* — Stephen R Koziol
*Assistant Examiner* — Raphael Schwartz
(74) *Attorney, Agent, or Firm* — Middleton Reutlinger

(57) ABSTRACT

Systems and methods prevent or restrict the mining of content on a mobile device. For example, a method may include identifying a mining-restriction mark in low order bits or high order bits in a frame buffer of a mobile device and determining whether the mining-restriction mark prevents mining of content. Mining includes non-transient storage of a copy or derivations of data in the frame buffer. The method may also include preventing the mining of data in the frame buffer when the mining-restriction mark prevents mining.

20 Claims, 8 Drawing Sheets

(56) References Cited

OTHER PUBLICATIONS

European Patent Office; Communication issued in Application No. 15764003.8 dated Apr. 3, 2018.

* cited by examiner

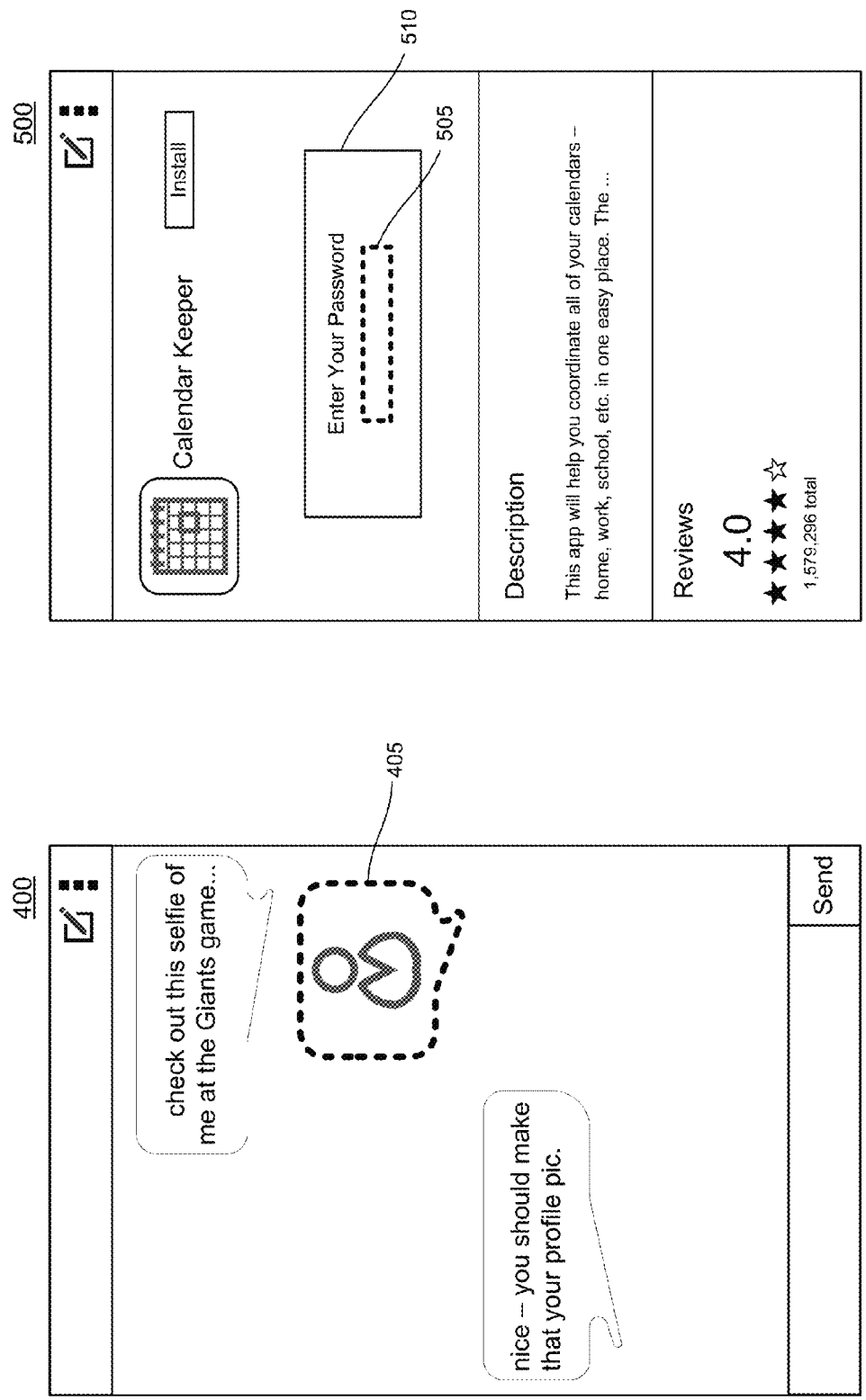

PROTECTING CONTENT ON A MOBILE DEVICE FROM MINING

RELATED APPLICATIONS

This application is a divisional of U.S. application Ser. No. 15/379,094, filed Dec. 14, 2017, which is a continuation of U.S. application Ser. No. 15/189,185, filed Jun. 22, 2016, which is a divisional of U.S. application Ser. No. 14/570,496, filed Dec. 15, 2014, which is a non-provisional of, and claims priority to, U.S. Provisional Application Ser. No. 62/042,775, filed Aug. 27, 2014, and to U.S. Provisional Application Ser. No. 62/061,240, filed Oct. 8, 2014, which are incorporated by reference herein in their entirety.

BACKGROUND

Due to the use of mobile devices, such as smartphones and tablets, user interaction with mobile applications has been increasing. But unlike web-based applications, mobile applications can differ significantly in the features they provide. For example, link structure, the user interface, and interaction with other applications can be inconsistent from one app to another. Additionally, because mobile applications are conventionally closed (e.g., cannot be crawled), the actions of the user cannot be used as context to improve the user experience, such as personalizing search, targeting advertising, and providing personalized suggestions and assistance. To address these issues, a mobile device may include a content agent that mines, analyzes, and stores information from screens or audio content output on the mobile device. Such agents may provide a more fluid, personal, and streamlined user experience through the capture and mining of the visual and audio content.

SUMMARY

While a content agent may enable a more personalized and streamlined user experience, some users and some mobile applications may not want certain content to be captured and mined. Implementations provide a mechanism for users and mobile application developers to designate and protect content from being mined and analyzed by a content agent. The mechanism may be in the form of a mining-restriction mark, which may or may not be visible to the user of the mobile device. In some implementations a mobile application developer may automatically include one or more mining-restriction marks in content generated by the application. In some implementations, the user of the mobile device may control the inclusion of mining-restriction marks. Mining-restriction marks may protect all content, e.g., an entire screen or audio file, or one or more portions of the content displayed on the screen. Mining-restriction marks may prevent any mining or may provide restrictions on some or all of the content presented on the mobile device. In some implementations, the user may, at installation time of a mobile application, indicate that content from the mobile application is to be protected via mining-restriction marks. In some implementations, the system may provide a user interface that enables the user to selectively turn on and off protection via mining-restriction marks and, optionally, to specify varying levels of protection via restrictions on mined content.

According to certain aspects of the disclosure, a method includes identifying, by a first application running on a mobile device, a mining-restriction mark in frame buffer data from the mobile device, the mining-restriction mark having been inserted by a second application prior to output on the mobile device and determining whether the mining-restriction mark prevents mining of content, wherein mining includes non-transient storage of a copy or derivations of the frame buffer data. The method may also include preventing the mining when the mining-restriction mark prevents mining. When the mining-restriction mark does not prevent mining, the method may include determining a restriction for the data based on the mining-restriction mark and providing the restriction with the data for further processing.

According to certain aspects of the disclosure, a method includes determining that content to be displayed on a screen of a mobile device includes content that matches a mining-restriction trigger, inserting a mining-restriction mark in the content that protects at least a portion of the content, and displaying the content, including the inserted mining-restriction mark, on the screen.

According to certain aspects of the disclosure, a mobile device may include at least one processor, a display device, and memory storing instructions that, when executed by the at least one processor, cause the mobile device to perform operations. The operations may include identifying a mining-restriction mark in low order bits or high order bits in a frame buffer of the mobile device, determining whether the mining-restriction mark prevents mining of content, wherein mining includes non-transient storage of a copy or derivations of data in the frame buffer, and preventing the mining of data in the frame buffer when the mining-restriction mark prevents mining.

According to certain aspects of the disclosure, a mobile device may include at least one processor, a display device, and memory storing instructions that, when executed by the at least one processor, generates a user interface. The user interface may be configured to receive a mining-restriction trigger, the mining-restriction trigger being associated by default with a first mining-restriction mark that prevents mining, receive a restriction for the mining-restriction trigger, replace the association of the mining-restriction trigger with the first mining-restriction mark with an association with a second mining-restriction mark that permits mining with the restriction, and store the mining-restriction trigger associated with the second mining-restriction mark.

According to certain aspects of the disclosure, a method includes performing recognition, by a first application running on a mobile device, on content generated by a second mobile application and determining that the content includes content matching a mining-restriction trigger. The method also includes determining whether the mining-restriction trigger prevents mining of the content, wherein mining includes storage of a copy or derivations of data in a frame buffer and preventing the mining when the mining-restriction mark prevents mining. The method may also include determining a restriction for the data based on the mining-restriction mark when the mining-restriction mark does not prevent mining and providing the restriction with the data for further processing.

According to certain aspects of the disclosure, a computer program product embodied on a computer-readable storage device includes instructions that, when executed by at least one processor formed in a substrate, cause a mobile device to perform any of the disclosed methods, operations, or processes. Another general aspect includes a system with a user interface and/or a method for generating a user interface that enables a user to control which content presented on the mobile device can be mined to streamline and personalize the user experience on the mobile device. Another general aspect includes a system and/or method for selecting content for mining, substantially as shown in and/or described in connection with at least one of the figures, and as set forth more completely in the claims.

In one general aspect, a computer program product embodied on a computer-readable storage device includes instructions that, when executed by at least one processor formed in a substrate, cause a mobile device to perform any of the disclosed methods, operations, or processes. Another general aspect includes a system with a user interface and/or a method for generating a user interface that enables a user to control which content presented on the mobile device can be mined to streamline and personalize the user experience on the mobile device. Another general aspect includes a system and/or method for selecting content for mining, substantially as shown in and/or described in connection with at least one of the figures, and as set forth more completely in the claims.

One or more of the implementations of the subject matter described herein can be implemented so as to realize one or more of the following advantages. As one example, implementations may provide mobile application developers and users of the mobile device with a mechanism to control what content can be used to enhance the user experience in the mobile environment. The mechanism may be granular, allowing the user or developer the ability to control mining of data elements, media types, or content including specific words or text formatting. The mechanism may also be flexible, allowing the user or developer to set levels of restriction, so that content may be protected from mining, may be mined but not shared, may be mined and shared but restrict mining on a device that did not generate the content (e.g. disallow mining on a recipient device), or may be mined but expire, etc. Some implementations can include a user interface that provides a user the opportunity to control mining parameters for one or more of the mobile applications. In some implementations, the mechanism may be visible, providing feedback to a user regarding the level of protection for the content.

The details of one or more implementations are set forth in the accompanying drawings and the description below. Other features will be apparent from the description and drawings, and from the claims.

BRIEF DESCRIPTION OF DRAWINGS

FIG. 4 illustrates an example display of a mobile computing device with a visible mining-restriction mark inserted based on a media type, according to an implementation.

FIG. 5 illustrates an example display of a mobile computing device with a visible mining-restriction mark protecting a data element, according to an implementation.

Like reference symbols in the various drawings indicate like elements.

DETAILED DESCRIPTION

Figure 1:
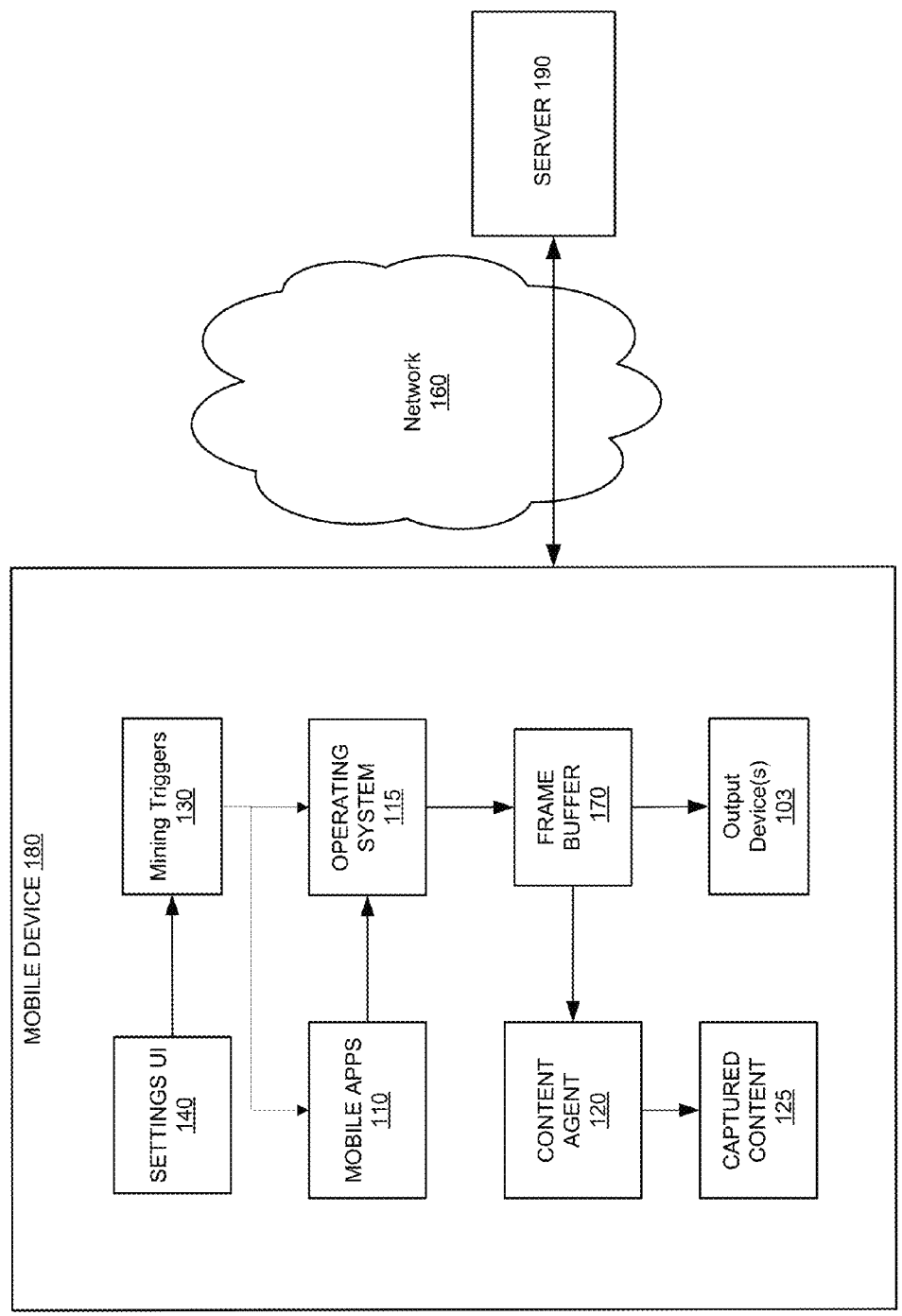
FIG. 1 is a block diagram illustrating an example system in accordance with the disclosed subject matter.

FIG. 1 is a block diagram of a mobile content agent system in accordance with an example implementation. The content agent 120 may be the first step in a process that provides a consistent user experience across mobile applications, so that similar type of actionable content behaves the same across applications, provides context for personalizing certain tasks, such as ranking search results and providing assistance, provides an interface to quickly discover user-relevant and content relevant content on the screen, or surfaces insightful relationships between entities displayed in the screen. The content agent 120 may also be the first step in a process that allows a user of a mobile device to share a screen with another user or to transfer the state of one mobile device to another mobile device or allows a mobile device to automatically perform a task with minimal input from the user. The content agent 120 may help accomplish these goals by capturing an image of a screen on a mobile device at intervals and providing the content for further processing via recognition tools. The further processing may be performed by the content agent 120 or by other modules, agents, or engines (not shown), which may be part of the system 100. For example, in some implementations, the further processing may include performing entity detection in a mobile app environment, either on a single captured image or on a window of sequentially captured images or both. Entities may be disambiguated, ranked, and associated with a user profile. An entity may be may be a person, place, item, idea, topic, word, phrase, abstract concept, concrete element, other suitable thing, or any combination of these, and may be used to personalize assistance provided to the user.

In some implementations, the further processing may include identifying actionable content in the captured image of a mobile device and providing default actions for the actionable content. Actionable content may include discovered entities, landmarks, and data that fits a template, such as phone numbers, email addresses, street addresses, dates, etc. Each type of actionable content may be associated with a default action. The system may generate annotation data that provides a visual cue for each actionable item. When a user selects the visual cue the system may initiate the default action. The system may identify actionable content across all applications used on a mobile device, making the user experience consistent. For example, while some mobile applications turn phone numbers into links that can be selected and called, other mobile applications do not. The annotation data generated by the system can provide the same functionality across mobile applications.

In some implementations, the further processing may include identifying content in the captured image that is important or relevant to the user of the mobile device. Content may be important or relevant because it summarizes a body of text or because it ranks highly with regard to user preferences. For example, the system may identify entities of interest based on a user profile, which can include interests specifically specified by the user or entities and collections of entities determined relevant to the user based on past interactions with mobile applications. When the system identifies a relevant entity in a structure element, e.g., one of a number of entries in a list, the system may include the entire structural element (e.g., the entire list entry) as relevant content. The system may also recognize a body of text in the image and use conventional summarization algorithms to identify elements of the text that effectively summarize the body of text. The elements that summarize the body are considered important or relevant content and may be highlighted or otherwise differentiated from other screen content using a visual cue in the annotation data.

In some implementations, the further processing may include identifying entities in a screen displayed on a mobile device and providing an interface for surfacing information about the entities without leaving the context of the mobile application. The interface may be combined with, for example, the actionable content interface described earlier, with a different input triggering the insight interface. For example, a visual cue generated for an entity may be actionable to initiate a default action when the entity is selected with a short tap and may be actionable to initiate a process that provides insight on the connection(s) of the entity to other entities on the screen with a long press. The second input can be referred to as an insight selection. If the user performs an insight selection on one entity, the system may traverse a data graph to find other entities related to the selected entity in the graph that also appear on the screen. If any are found, the system may provide annotation data that shows the connections and, optionally, a description of the connection. If a user performs an insight selection on two entities at the same time, the system may walk the data graph to determine a relationship between the two entities, if one exists, and provide annotation data that explains the connection.

In some implementations, the further processing may include identifying key items in a screen capture image and generating an index that matches the key items to the screen capture image. Key items may be words, phrases, entities, landmarks, logos, etc., discovered via recognition performed on the image. The index may be an inverted index that, for each key item, includes a list of images associated with the key item. In some implementations, any annotation data generated for an image may also be stored with the image. The system may rank key items using conventional signals as well as signals unique to the mobile environment.

In some implementations, the further processing may include sharing a captured screen or a previously captured screen with others. The system may enable the user to choose the areas of the screen to share. Because sharing works across all mobile applications running on the mobile device, sharing a picture works the same as sharing a news article, making the user experience more fluid and consistent. The user may also choose to share a previously viewed screen, e.g., by querying the index of previously captured screens and selecting a previously captured screen to share. Sharing may occur directly from mobile device to mobile device or via a server. In a server implementation, sharing the screen may include copying the screen from the sender's data to the recipient's data store of shared screens and sending a notification that the screen is ready to be viewed.

In some implementations, the further processing may include transmitting the content to a recipient device but preventing mining on the recipient device. For example, in communications-based mobile applications such as video chat applications, texting applications, and picture-sharing applications, the originating mobile device, or the mobile device sending the content (e.g., text, images, video, or audio), may or may not have a content agent installed, but the recipient mobile device may be running a content agent. The user of the originating mobile device may desire to keep the recipient device from capturing content generated on and transmitted from the originating mobile device. Thus, in some implementations, the originating mobile device may insert a mining-restriction mark in shared content that prevents mining on the recipient device.

The non-limiting examples of further processing described above are examples of mining. As used herein, mining includes storing a non-transitory copy of the captured image and/or data derived from the captured image, e.g., the extraction of objects or features, such as text, entities, landmarks, logos, etc. from the captured image and the location of these objects in the image. The objects or features can be used in the further processing described above or in other analysis processes. Mining as used herein excludes any local processing or storage performed for the purposes of detecting the mining-restriction mark in the content.

The system 100 of FIG. 1 includes a content agent 120 that is sensitive to mining-restriction marks inserted into content by mobile applications and/or the operating system. The mining-restriction marks may prevent the content agent 120 from mining the captured image, e.g., from extracting and analyzing objects and storing a copy of the captured image, or may provide restrictions with regard to the uses of the objects and/or the copy. The mining-restriction marks may be inserted by one or more mobile applications 110 or the operating system 115. In some implementations, the content agent 120 may access mining-restriction triggers to determine whether the captured image includes content that corresponds to a mining-restriction trigger. When the content agent finds such content, it may terminate any further processing when the trigger prevents mining, or may process the content in accordance with any restrictions represented by the trigger. In some implementations, the system 100 may provide a settings user interface (UI) 140 that enables the user to adjust and change aspects of the mining-restriction marks inserted by the mobile applications 110, the operating system 115, or both. While the system 100 in FIG. 1 is described as client-server system, in which some data processing can occur at a server 190, such as certain aspects of the further processing, other configurations may be used. For example, the data processing may occur exclusively on the mobile device 180, and some tasks may be performed by different elements. Thus, implementations are not limited to the exact configurations illustrated.

Figure 10:
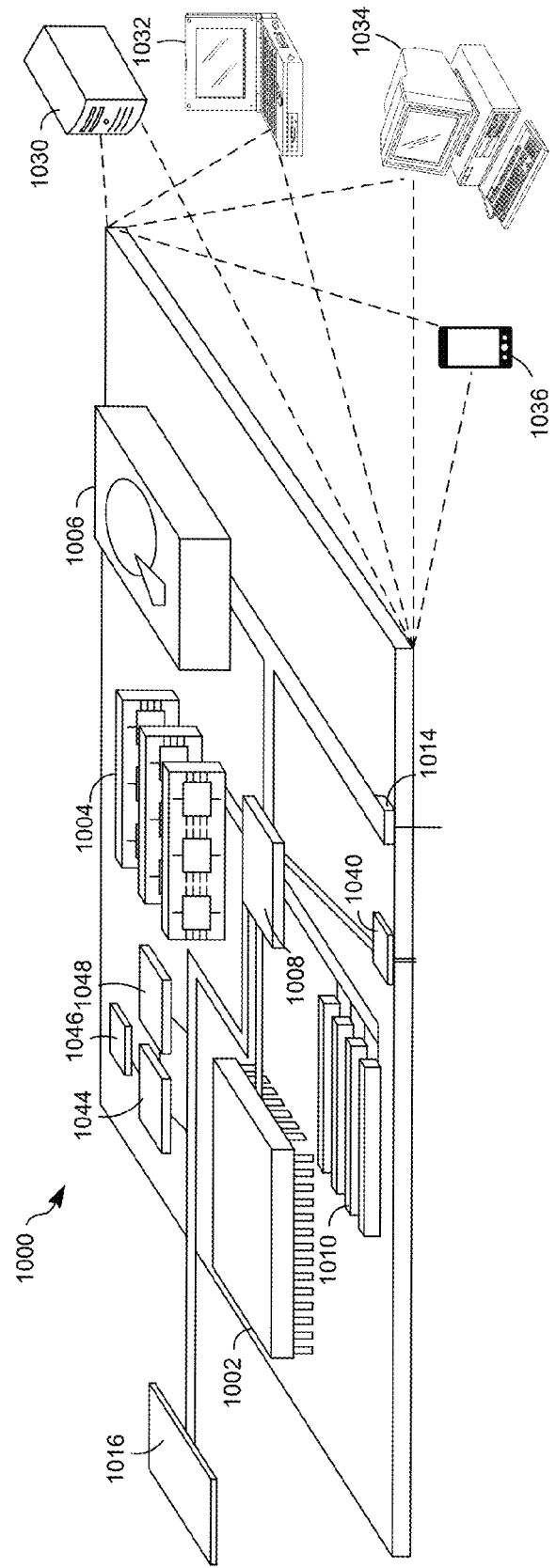
FIG. 10 shows an example of a computer device that can be used to implement the described techniques.

The mobile content agent system 100 may include mobile device 180. Mobile device 180 may be any mobile personal computing device, such as a smartphone or other handheld computing device, a tablet, a wearable computing device, etc., that operates in a closed mobile environment rather than a conventional open web-based environment. Mobile device 180 may be an example of computer device 1000, as depicted in FIG. 10. Mobile device 180 may include one or more processors formed in a substrate configured to execute one or more machine executable instructions or pieces of software, firmware, or a combination thereof. The mobile device 180 may include an operating system 115 and one or more computer memories configured to store one or more pieces of data, either temporarily, permanently, semi-permanently, or a combination thereof. The mobile device 180 may thus include applications, including mobile applications 110, content agent 120, and settings UI 140, which represent machine executable instructions in the form of software, firmware, or a combination thereof. Conventionally, mobile applications, such as mobile applications 110, operate in a closed environment, meaning that the user employs separate applications to perform activities conventionally performed in a web-based browser environment. For example, rather than going to hotels.com to book a hotel or opentable.com to make a reservation, a user of the mobile device 180 can use a mobile application provided by hotels.com or opentable.com respectively. The mobile device 180 may also include one or more output devices 103. The output devices may include a display device for displaying visual content and speakers for presenting audio content.

The mobile device 180 may include content agent 120. The content agent 120 may be configured to capture the current screen, e.g. by copying or reading the contents of the mobile device's frame buffer. It is understood that the mobile device provides visual content and audio content in the form of data. The data in the frame buffer thus represents objects understood by a mobile application and the user, such as text, pictures, icons, logos, etc. Thus, as used herein content may be understood to be the data in the frame buffer and the objects they represent to the user or the mobile application. Mined content may be understood to represent the recognition and extraction of the objects from the frame buffer data by a computer, so that the bits that represent the word cat are recognized by the computer as text spelling c-a-t and/or an entity representing a cat and the bits representing an image are recognized as an image, etc. The content agent 120 may capture the current screen at intervals or upon a command by the user of the mobile device 180. For example, the user may perform an action, such as a swipe up, a swipe down, a diagonal swipe, a two-finger swipe, etc., that initiates a screen capture by the content agent 120. Alternatively, the content agent 120 may capture the screen at some interval, perhaps a small interval, such as every half second or every second. The content agent 120 may provide captured content 125, e.g., the data from the frame buffer, for mining. As indicated above, this includes extraction of objects (e.g., via recognition performed on the data) and/or storage of the copy for later user. In some implementations, the content agent 120 may also capture audio content sent to the output devices 103. Thus, in some implementations, the captured content 125 may include audio files, annotations or tags (e.g., "train whistle" or "engine sound"), or text recognized in the audio files, depending on the implementation. The content agent 120 may use an output audio buffer used to produce sound via an output device 103. The content agent 120 of FIG. 1 is sensitive to mining-restriction marks inserted into the content, as will be described in more detail herein. It is also understood that the content agent 120 may operate under user permission, e.g., a program installed or activated by the user of the mobile device.

In some implementations, the content agent 120 may also capture user input actions. User input actions represents user input gestures such as taps, swipes, text input, or any other action the user takes to interact with a touch-screen of the mobile device 180. The content agent 120 may record a timestamp for each action that indicates when the action occurred. The content agent 120 may also record the screen coordinates for a touch action, beginning and ending coordinates for a swipe or smudge action, and the text entered for keyboard actions. If the user performs a multiple finger action, the data stored for the input action may include multiple entries with the same timestamp. For example if the user "pinches" with two fingers to zoom out, the content agent 120 may record one data entry for the first (e.g., index finger) digit and a second data entry for the second (e.g., thumb) digit, each having the same timestamp. The user input actions may be considered another type of content in captured content 125.

The content agent 120 may provide the captured content 125 and, optionally any metadata, to another engine, application, or module for mining (e.g., further processing). Mining may include non-transitory storage of the captured content 125 or derivations of the captured content. Derivations include storing less than all captured content 125, storing additional data with captured content 125, or modifying the captured content 125. As discussed above, the further processing may include recognition (image, logo, text, etc.), entity extraction, indexing, transmitting, etc., to provide additional functionality or information to the user of the mobile device. The metadata may include any restrictions associated with areas of the captured image encompassed by a mining-restriction mark and data and objects extracted from that area. The metadata may also include a timestamp, a mobile device type, a location of the mobile device, a mobile device identifier, the mobile application running when the screen was captured, or in other words the application that generated the screen or audio content, and other device information, such as which applications were active, ambient light, motion of the device, etc. The restrictions may restrict certain uses of the content, such as sharing or indexing, or may restrict any uses before or after a certain time. Other metadata may assist in further processing (e.g., entity disambiguation, ranking search results) and deciding what extracted objects, extracted from the data in the frame buffer, are most relevant to the user of the mobile device.

Another form of further processing includes automating some tasks or sharing an application state using captured content in the form of user input actions. For example, after selecting a previously captured image from a search result, e.g., via a search of an index of previously captured images, the system may include an application that attempts to take the user back to the mobile application that generated the screen and use the user input actions to re-create the series of interactions that resulted in the captured image. Thus, the system may allow the user to jump back to the place in the application that they had previously been. Sharing the user input actions may enable a user to switch mobile devices while maintaining a particular state. In other words, the user of mobile device may share a screen and user input actions with a second mobile device and the second mobile device may use the sequence of user input actions and the shared screen to achieve the state represented by the shared screen. User input actions may also be used to repeat some previously performed action using minimal additional data. For example, the system may enable the user to repeat the reservation of a restaurant using a new date and time.

The mobile device 180 may also include settings UI 140. The settings UI 140 may be configured to enable the user to control which content is protected from mining and, if mining is allowed, place restrictions on the content. In other words, in some implementations, the settings UI may provide the user of the mobile device 180 with the ability to control the actions of a content agent 120. The level of granularity provided by the settings UI 140 may depend on the implementation. For example, the settings UI 140 may enable the user to select a mobile application 110 or a type of mobile application 110 and turn on or turn off mining of content, including user input actions, generated by the mobile application 110 or while the mobile application 100 is running. As another example, the settings UI 140 may enable the user to place restrictions on content generated by a mobile application 110 or a type of mobile application 110 (e.g., a communications mobile app). As another example, the settings UI 140 may enable the user to turn off the content agent 120 or disable all mining by the content agent 120. As another example, the settings UI 140 may enable the user to designate certain data elements, media types, or text as protected from mining, regardless of which application generated the content. For example, the settings UI 140 may enable the user to turn off collection of user input actions by the content agent 120. As another example, the settings UI 140 may enable the user to prevent mining of pictures. In some implementations, the settings UI 140 may prevent mining of entity types, for example preventing the mining of phone numbers or email addresses. The settings UI 140 may also enable the user to select levels of restrictions, which may allow mining of the marked content, but disallow certain uses or any use after a certain time period or before a certain time period. For example, the restrictions may allow mining of the content on the device that generated the content but disallow mining of the content on any other device. In some implementations, the developer of the content agent 120 may provide the settings UI 140. In some implementations, a developer of a mobile application 110 may provide some functionality of the settings UI 140 that pertains to the mobile application 110, so that restrictions and mining-restriction triggers apply only to content generated by the mobile application 110.

In some implementations, the UI 140 may be configured with functionality that enables a user to see any content currently displayed that is protected by a mining-restriction mark. For example, when the user performs a predefined gesture or input sequence, the UI 140 may highlight or otherwise provide an indication to the user of content protected by mining-restriction marks, even if the mining-restriction marks themselves are not visible to the user. In some implementations, the UI 140 may be configured with functionality that enables a user to select content currently displayed on the device and indicate that one or more portions of the content are to be protected by a mining-restriction mark. In other words, the UI 140 may enable a user to view content and label a portion of the displayed content as mining-restricted, generating a mining trigger for the labeled content.

The mobile device 180 may include mining-restriction triggers 130. The mining-restriction triggers 130 may be established by a mobile application 110, the operating system 115, or the settings UI 140. The mining-restriction triggers 130 represent conditions that result in the insertion of a mining-restriction mark or otherwise cause the content agent 120 to ignore content or process content with restrictions. The conditions may be based on a specific data element, a media type (e.g., pictures, audio files, video files, etc.), a particular text format, a particular pattern or regular expression, a particular type of mobile application, or may represent words, phrases, or n-grams found in text. In some implementations, the trigger may be an identifier for a mobile application, so that any content generated by the mobile application includes a mining-restriction mark. In some implementations, the trigger may be a mobile application type, so that any application of that type may insert a mining-restriction mark to protect the content. For example, a component of the operating system may insert the mark when the mobile application is a communications application or when the content is captured via a sensor, such as a camera or microphone. The mark may protect certain media types, such as images, video and audio, or may protect any content generated in the communications application, e.g., an image or video sharing application.

In some implementations, a specific trigger may have an associated mining-restriction mark type. The type of mining-restriction mark may represent the level of protection, or in other words restrictions on mining and the use of mined content. For example, one type may prevent any mining. In other words, the content represented by the captured image is not provided for mining. This means that no objects are extracted and used for further processing, such as entity detection, generating insights, or providing other personalized assistance. Another type of mining-restriction mark may allow mining but prevent sharing. As described above, the content agent 120 may make a copy of the captured screen and provide the copy to a program that enables the user to designate another user to receive the copy. The user may also share the copy with another mobile device owned by the user, so that the user can transfer the state of the first mobile device to the second device. A mining-restriction mark type may prevent this sharing of the copy. Another type of mining-restriction mark may permit sharing, but prevent mining on the recipient device. Another type of mining-restriction mark may allow mining but have an expiration date. The expiration date may be tied to any objects extracted from the captured image and any copy made. Thus, any use of the objects or copy may cease after the expiration date. Another type of mining-restriction mark may allow mining but not indexing, etc. In some implementations, the settings UI 140 maintains at least some of the mining-restriction triggers 130. In some implementations, mining-restriction triggers 130 may be set at installation time of a mobile application 110, either by the mobile application or the user. In some implementations, the mining-restriction triggers 130 may include an entry that causes the content agent 120 to refrain from collecting user input actions, or to refrain from collecting user input actions when a particular mobile application is running.

While settings UI 140 and content agent 120 are illustrated as separate applications running on the mobile device 180, it is understood that one or more of the components identified in the settings UI 140 and the content agent 120 may be part of the operating system 115. In some implementations, all components of the content agent 120 and settings UI 140 may be part of the operating system 115. In some implementations, one or more of the components of settings UI 140 may be performed at the server 190 so, for example, the user could have a mining-restriction trigger profile that is downloaded to update the mining-restriction triggers 130 for any mobile device the user is logged into.

Figure 11:
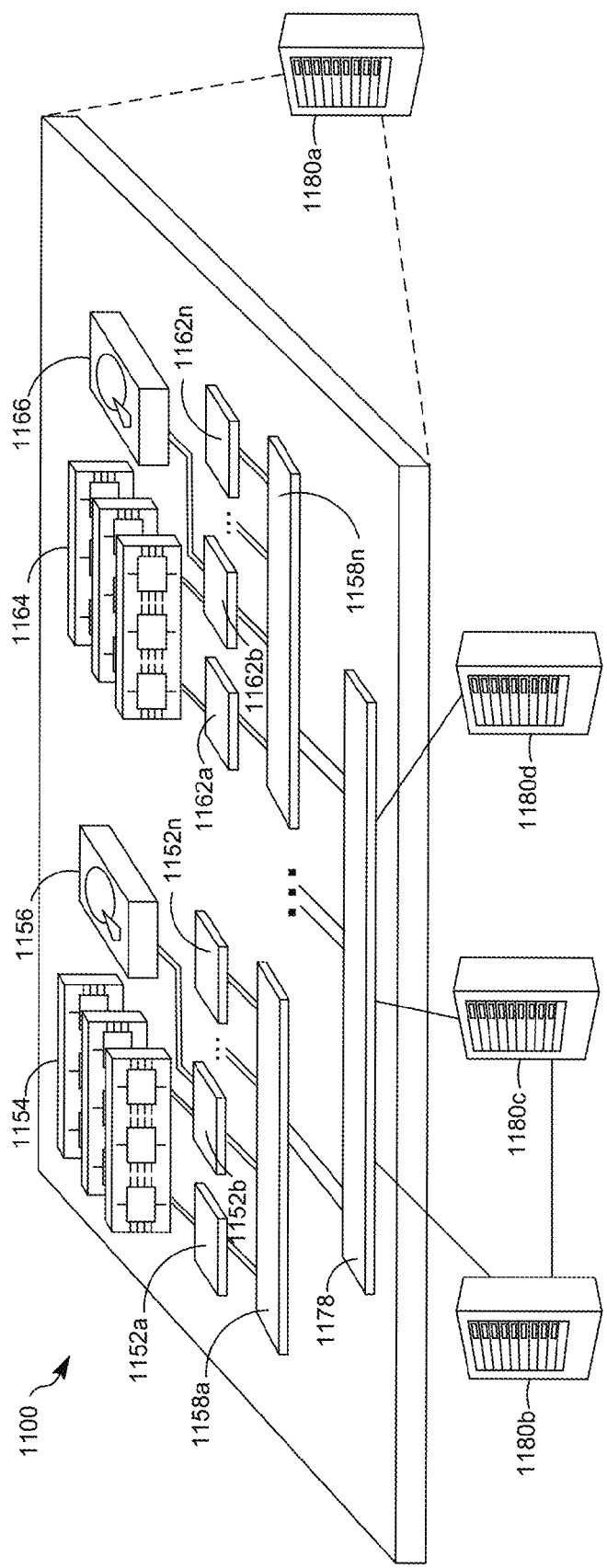
FIG. 11 shows an example of a distributed computer device that can be used to implement the described techniques.

The mobile content agent system 100 may include a server 190, which may be a computing device or devices that take the form of a number of different devices, for example a standard server, a group of such servers, or a rack server system, which can be distributed across multiple computing devices. In addition, server 190 may be implemented in a personal computer, for example a laptop computer. The server 190 may be an example of computer device 1000, as depicted in FIG. 10, or computer device 1100, as depicted in FIG. 11. Server 190 may include a user account for the user of mobile device 180 and may be used to store information, such as an index of mined content for the user, or may be used to share captured screen images.

In some implementations, the system 100 may include an index of mined content. The index may be stored at the mobile device 180 or at the server 190, or both. The index may be an inverted index that stores key values and lists of images (e.g., images captured by content agent 120), that include the key values. The key values may be text, entities, logos, locations, etc. discovered during further processing on the captured content 125. Each captured image may be associated with metadata, including, for example, a timestamp, a rank for the key value for the image, coordinates in the image where the key value can be found, etc. In some implementations, the metadata may include an expiration date. The expiration date may be set based on a mining-restriction mark associated with the image and/or the key item identified in the image.

The mobile device 180 may be in communication with the server 190 and with other mobile devices over network 160. Network 160 may be for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160, the server 190 may communicate with and transmit data to/from mobile device 180 and the mobile device 180 may communicate with and transmit data to the server 190 and other computing devices.

The mobile content agent system 100 represents one example configuration and implementations may incorporate other configurations. For example, some implementations may combine one or more of the components of the settings UI 140, content agent 120, operating system 115, mobile applications 110, and mining-restriction triggers 130 a single module or engine, one or more of the components of the settings UI 140 may be performed by the server 190. As another example one or more of the data stores, such as mining-restriction triggers 130 and captured content 125, may be combined into a single data store, distributed across multiple data stores or files, may distributed across multiple computing devices, or may be stored at the server 190.

To the extent that the mobile content agent system 100 collects and stores user-specific data or may make use of personal information, the users may be provided with an opportunity to control whether programs or features collect the user information (e.g., information about a user's social network, social actions or activities, user input actions, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a mobile content agent system.

It is noted here, and applicable to various of the embodiments described herein, that capabilities may be provided to determine whether capture of content and other functionality is consistent with rights of use of content, layout, functionality or other aspects of the image being displayed on the device screen, and setting capabilities accordingly. For example, some mining-restriction triggers may be provided that limit content capture where doing so could be in contravention of terms of service, content license, or other limitations on use. Such triggers or settings may be manually or automatically made, such as by a user when establishing a new service or device use permissions, or by an app installation routine or the like and may not be modifiable via settings UI 140.

In order to provide the user and content providers of a mobile device the ability to control what mobile content is available for analysis and storage to improve the user experience, disclosed implementations provide a content agent that recognizes and complies with mining-restriction marks in the content. The mining-restriction marks may or may not be visible to a user of the mobile device. Visible marks may provide a confirmation to the user that the content is protected from mining. Visible mining-restriction marks can act as a reminder that the visual material is secure from being mined or is protected with restrictions. For example, a mining-restriction mark may protect certain fields on a screen (e.g., a dollar amount) and the mining-restriction mark can provide a visual indication to the user of the protection of these fields. Human-imperceptible (e.g., non-visible) mining-restriction marks may be used when visible marks may be distracting. For example, if a user has instructed the system that all content from a work email system is not to be mined, the user may not need a visual reminder of this, and it may be simpler to use a non-visible mining-restriction mark to protect the content generated by the work email application. In some implementations, the visible marks may provide an indication to the user of restrictions placed on the mining of the content. Mining-restriction marks protecting audio content may also be human-perceptible. For example, a mining-restriction mark protecting audio may add a repeating sound, such as a short beep, chirp, bell, or other sound, to the audio that lets the listener know the audio content is protected from capture. The sound may also be an indication of a restriction placed on the mining of audio content.

Figure 2:
FIG. 2 illustrates an example display of a mobile computing device with a visible mining-restriction mark, according to an implementation.

FIG. 2 illustrates an example display 200 of a mobile computing device with a visible mining-restriction mark 205. A mobile content agent system, such as system 100 of FIG. 1, may generate the mining-restriction mark 205 in the display 200. In the example of FIG. 2, the display 200 includes a visible mining-restriction mark 205 that includes all of the content generated by a mobile application. In the example of FIG. 2, the mining-restriction mark 205 is a watermark displayed with the content generated by the mobile application. In some implementations, the mobile application that generated the content in display 200 may have inserted the mining-restriction mark. In some implementations, the operating system may have inserted the mining-restriction mark after determining that the mobile application that generated the content is protected, for example via a mining-restriction trigger stored in mining-restriction triggers 130 of FIG. 1. In some implementations, the mining-restriction mark 205 may have a color or pattern that provides an indication of the type of protection provided. For example, if the mining-restriction mark 205 is red, the mining-restriction mark 205 may prevent any mining of the content in display 200. If the mining-restriction mark 205 is green, the mining-restriction mark 205 may allow capture and mining but prevent the mined content, e.g., objects extracted from the content or a copy of the content, from being shared with another mobile computing device. In some implementations, the mining-restriction mark may prevent the sharing the mined content with an account associated with the user on a server. If the mining-restriction mark 205 is yellow, the mining-restriction mark 205 may allow capture and mining of the content for a given period of time, after which the mined content is no longer used. Of course, different patterns may also convey an indication of the type of protection provided. It is understood that while the mining-restriction mark 205 in the example of FIG. 2 is visible, implementations are not so limited. The mining-restriction mark may be added to the low order bits or high order bits of the display (e.g., the frame buffer), which the user may not be able to see, or may not notice. In this implementation, the mining-restriction mark may be some pattern that is not likely to appear in the high or low order bits. The system may use different patterns to indicate the level of protection, similar to the color or pattern of the visible mining-restriction mark 205.

Figure 3:
FIG. 3 illustrates an example display of a mobile computing device with a visible mining-restriction mark inserted based on a mining-restriction trigger in the displayed content, according to an implementation.

FIG. 3 illustrates an example display 300 of a mobile computing device with a visible mining-restriction mark 305 inserted based on a mining-restriction trigger 310 in the content of the display. A mobile content agent system, such as system 100 of FIG. 1, may generate the mining-restriction mark 305 in display 300. In the example of FIG. 3, the user may have provided the term PRIVILEGED as a mining-restriction trigger, which may cause the mobile application that generated the content in display 300 or the operating system to insert the mining-restriction mark 305. The mining-restriction mark 305 may be similar to mining-restriction mark 205 of FIG. 2 in that it is a watermark and may include an indication of the type of protection. The mining-restriction mark 305 is an example of a mining-restriction mark that protects the text in display 300, but may not protect the control elements appearing at the top and bottom of the display.

FIG. 4 illustrates an example display 400 of a mobile computing device with a visible mining-restriction mark 405 that protects a media type, according to an implementation. In the example of FIG. 4, the media type is a picture. A mobile content agent system, such as system 100 of FIG. 1, may generate the mining-restriction mark 405 in display 400. In one implementation, the user of the computing device may have selected pictures as a protected media type, either for this particular mobile application or for all mobile applications. In another implementation, the developer of the mobile application may have decided that pictures appearing in the content generated by the mobile application will be protected. In either implementation, the system may insert the mining-restriction mark 405 around the picture, which is the protected media type. The mining-restriction mark 405 in this example is also visible to the user of the mobile device and may include an indication of the level of mining protection. For example, a particular pattern or color may indicate no mining, mining but not sharing, mining but for a limited period, etc. Of course, the mining-restriction mark 405 may take any shape, for example a rectangle, oval, circle, or any other shape that encloses the media to be protected by the mark. Furthermore, instead of a shape outline, the mining-restriction mark 405 may be a watermark that covers or encompasses the media. In some implementations, the picture media type may be an example of a mining-restriction trigger recognized by the mobile application, the operating system, or both.

In some implementations, the system may also protect text entered by the user in a communications application, such as the application that generated display 400. For example, the system may determine that a running application is a communication application and may, when the user is entering into an input field, add a mining-restriction mark for the input that allows mining on the mobile device, but will prevent mining on a different device. In some implementations, protection of text-input in communications may occur at a device-level, so that the system provides a mining-restriction mark to protect text input provided in any communications application or via a sensor, such as a camera or microphone. In some implementations, the mobile application may insert the mining-restriction mark for the text input.

FIG. 5 illustrates an example display 500 of a mobile computing device with a visible mining-restriction mark 505 that protects a data element, according to an implementation. A mobile content agent system, such as system 100 of FIG. 1, may generate the mining-restriction mark 505 in display 500. In the example of FIG. 5, the data element is a password, but the data element could be other types of elements, such as a user name, an email, a phone number, etc. In various implementations, the user of the computing device may have selected the data element as protected, the operating system may have protected the data element by default or in accordance with terms of service, or the developer of the mobile application may have decided that the data element should be protected. In some implementations, the password may be an example of a mining-restriction trigger. Similar to mining-restriction mark 405 of FIG. 4, mining-restriction mark 505 is not limited to an outline of any particular shape using any particular pattern or color and may include a watermark of any pattern and color. In some implementations, the system may protect more than the data element itself, for example by protecting the content enclosed in the pop-up window 510 of display 500 from mining.

Figures 6, 7:
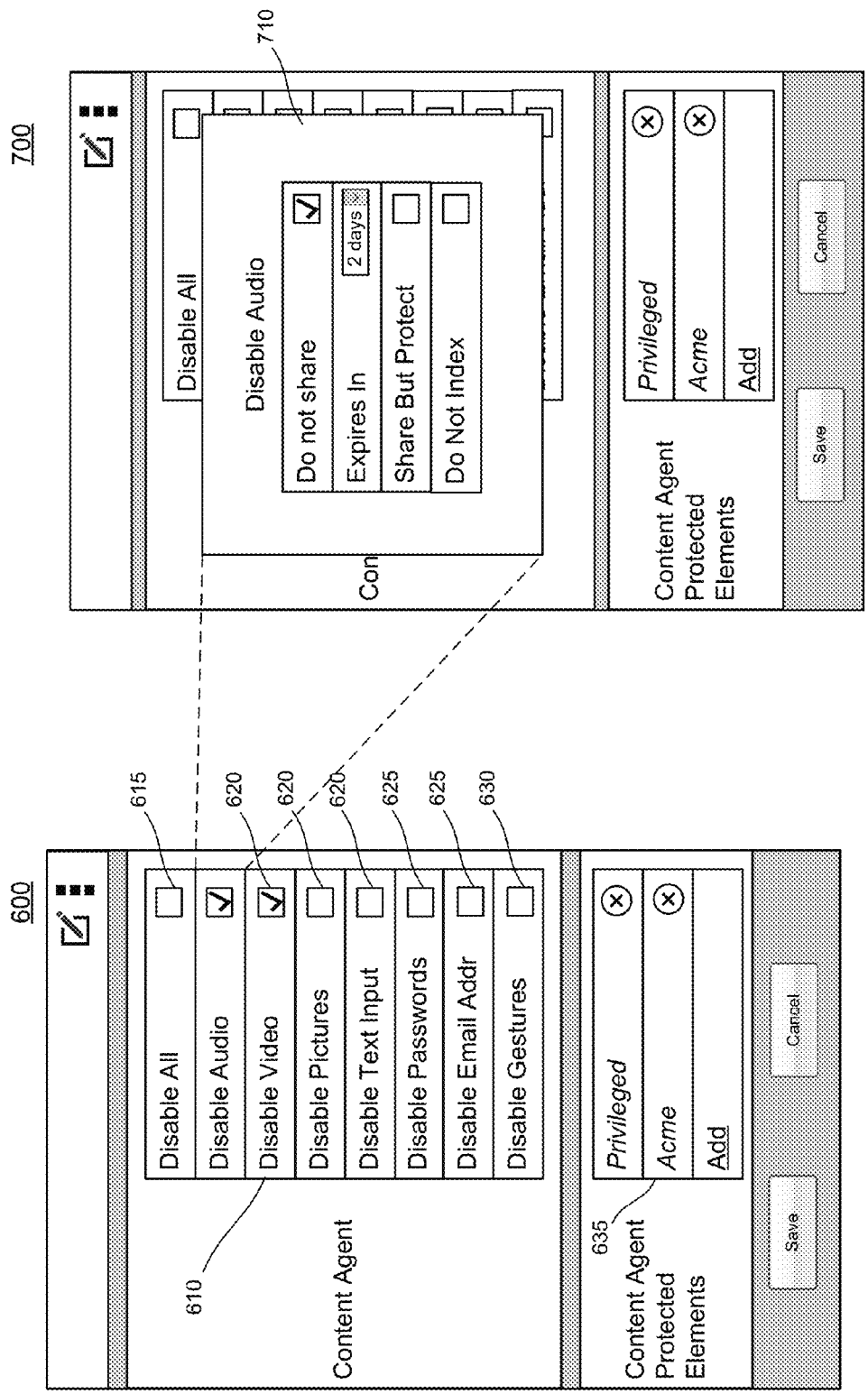
FIG. 6 illustrates an example user interface for designating content as protected from mining and for designating mining-restriction triggers, according to an implementation.
FIG. 7 illustrates an example user interface for designating restrictions on content mining, according to an implementation.

FIG. 6 illustrates an example user interface 600 for designating content protected from mining and for designating mining-restriction triggers, according to an implementation. A mobile content agent system, such as system 100 of FIG. 1, may generate the user interface 600. In some implementations, the user interface 600 may be generated by settings UI 140. In the example of FIG. 6, the user interface 600 allows the user to select and adjust settings that apply to all mobile applications, or in other words the settings are global for the content agent. It is understood that in some implementations each mobile application may have a settings user interface similar to user interface 600, but the mining-restriction mark settings would apply only to content generated by the mobile application. In other words, if the settings user interface is for a particular mobile application and the user selects "disable pictures", the particular mobile application would mark pictures with a mining-restriction mark, but other mobile applications may not. In some implementations, such a settings user interface may be presented to the user at install time, or may be accessible after install. It is also understood that the controls, media types, and data elements illustrated and examples and implementations are not limited to the media types, data elements, or controls illustrated in user interface 600.

In the example of FIG. 6, the user interface 600 includes controls 610 for protecting various types of media and data elements. In some implementations, controls 610 may include a disable all control 615. The disable all control 615 may enable the user to turn off the content agent, either by terminating the content agent until the disable all control 615 is unselected or by the operating system inserting a mining-restriction mark to protect all content, no matter what application generated the content. Such a mining-restriction mark may always be inserted into the frame buffer, for example, until the disable all control 615 is unselected. In such implementations, the disable all control 615 may be considered a mining-restriction trigger. The controls 610 may also include controls 620 to protect media types, such as video, audio, text input, pictures, etc. Selecting one of controls 620 may cause the system to generate a mining-restriction trigger that will cause the system to insert a mining-restriction mark to protect the corresponding media, for example as illustrated in FIG. 4. In the example of user interface 600, where the controls apply globally, the operating system may analyze content provided for output on the mobile device for a media type protected by a mining-restriction trigger. If a mining-restriction trigger does protect the media type, the operating system may insert an appropriate mining-restriction mark before the content is output. Of course, if the triggers are for a particular mobile application, the mobile application may insert the mining-restriction mark prior to providing the content for output.

The controls 610 may also include controls 625 to protect certain data elements, such as passwords, user names, email addresses, etc. Selection of one of the controls 625 may cause the system to generate a corresponding mining-restriction trigger. Similar to the controls 620 for media types, controls 625 may cause the operating system or mobile application (depending on the implementation) to insert a mining-restriction mark to protect the corresponding data element when it is identified in text to be output on the mobile device. In some implementations, the system may use labels or templates to identify the data elements.

The controls 610 may also include control 630 to protect collection of gestures, or user input actions, such as swipes, clicks, smudges, taps, etc. As discussed above, the content agent may capture such user interactions to assist with automation of repeat tasks, for example. The control 630 may enable a user to turn off collection of such user input actions. As with the other controls 620 and 625, the control 630 may be provided in an application specific user interface, so that the content agent does not collect user input actions when the particular application is running.

User interface 600 may also include controls 635, which represent protected words, phrases, terms, or n-grams. The user may provide the words or phrases that the user wishes to trigger protection from content mining. Thus, the addition of one of controls 635 may cause the system to generate a corresponding mining-restriction trigger. When content to be output on the mobile device includes a protected word or phase (e.g., as indicated in the mining-restriction trigger), the operating system may analyze the content for text matching the trigger and insert a mining-restriction mark to protect the content from mining if a matching trigger is found. In some implementations, the content agent may perform recognition on a screen capture image and look for items that correspond to a mining-restriction trigger, e.g., one of controls 635. The controls 635 of user interface 600 thus enable a user to personalize the protection of content in ways that a mobile application developer could not anticipate for all users. For example, if the user does not want communications with or communications that mention a particular person to be mined, the user may add the person's name, nickname, and/or partial email address, via controls 635, as a mining-restriction trigger. In addition to words, phrases, terms, etc., the controls 635 may include text formatting. For example, the user may specify a text format, such as Calibri italic font, and the system may store this text format as a mining-restriction trigger. Then, in one implementation, when the system finds text having the specified format in content to be output to the display, the system may determine that the content is protected and insert a mining-restriction mark, e.g., in low order or high order bits of the frame buffer. In another implementation, the content agent may determine whether a screen capture image includes content protected by a mining-restriction trigger and may treat the content in accordance with the trigger and its restrictions (e.g., by discontinuing any further processing if the mark prevents mining, etc.).

Any of the mining-restriction triggers represented by controls 610 and 635 may be customizable, so that the mining-restriction mark associated with the mining-restriction trigger has a level of protection. The level of protection may prevent mining or may allow mining with one or more restrictions. FIG. 7 illustrates an example user interface 700 for designating restrictions on mining content, according to an implementation. A mobile content agent system, such as system 100 of FIG. 1, may generate the user interface 710 in response to selection of a control that creates a mining-restriction trigger. In the example of FIG. 7, the system generates user interface 710 in response to selection of the "Disable Audio" control of user interface 600. The user interface 710 may enable the user to select restrictions on any protected content. For example, the user may restrict any captured audio from sharing. Thus, for example, any captured audio and any recognition, analysis, and storage of the audio may be kept on the mobile device, but may not be shared with another device and/or a user account on a server, etc. In another example, the captured audio may have an expiration date, so that it is not kept after the date. In another example, the audio may be shared, but may not be mined on the second device (e.g., the destination device). In other words, the audio may be shared with another device, but a content agent on the other device may not capture or index the audio content. In some implementations, the restriction may allow sharing with a recipient device but not disallow the recipient device to share the content. For example, when the content agent on the recipient device encounters the mining-restriction mark it may mine and index the content but add a restriction that disallows sharing. In another example, the captured audio may be analyzed, for example to identify entities relevant to the user, but the mined content may not be indexed. While these three examples are illustrated in user interface 710, it is understood that implementations may include other restrictions, such as not sharing prior to a specified date, etc.

Each restriction may be represented by a different pattern or type of mining-restriction mark. Thus, for example, when a mining-restriction trigger is generated by selection of a control in user interface 600, the system may associate a mining-restriction mark with the mining-restriction trigger that prevents mining. The system may associate another mining-restriction mark with the mining-restriction trigger if and when the user selects a restriction, for example via user interface 710. In some implementations, the color or pattern or both of the mining-restriction mark may reflect the particular restriction. In some implementations, the mining-restriction mark may include an indication of the device the content was generated on. For example, the mining-restriction mark may be based on a hash of the device identifier or other unique information, such as a timestamp of the most recent power-up, etc. Such a mining-restriction mark may be inserted when the content is commonly transmitted to other devices (e.g., as part of a communication type mobile application), but the user or mobile application developer does not want the content mined on devices the content is shared with. Thus, for example, a content agent running on the originating device may recognize the mining-restriction mark as a hash of its device identifier and determine that mining is permitted. The mining-restriction mark may be transmitted with the content to a second device, identified by the user. The content agent running on the second device, however, will recognize the mining-restriction mark but will not recognize the mark as a hash of its device identifier. Thus, the content agent on the second device may determine that the mining-restriction mark prevents mining. It is also understood that any mining-restriction trigger may be associated with one or more of these restrictions.

Figure 8:
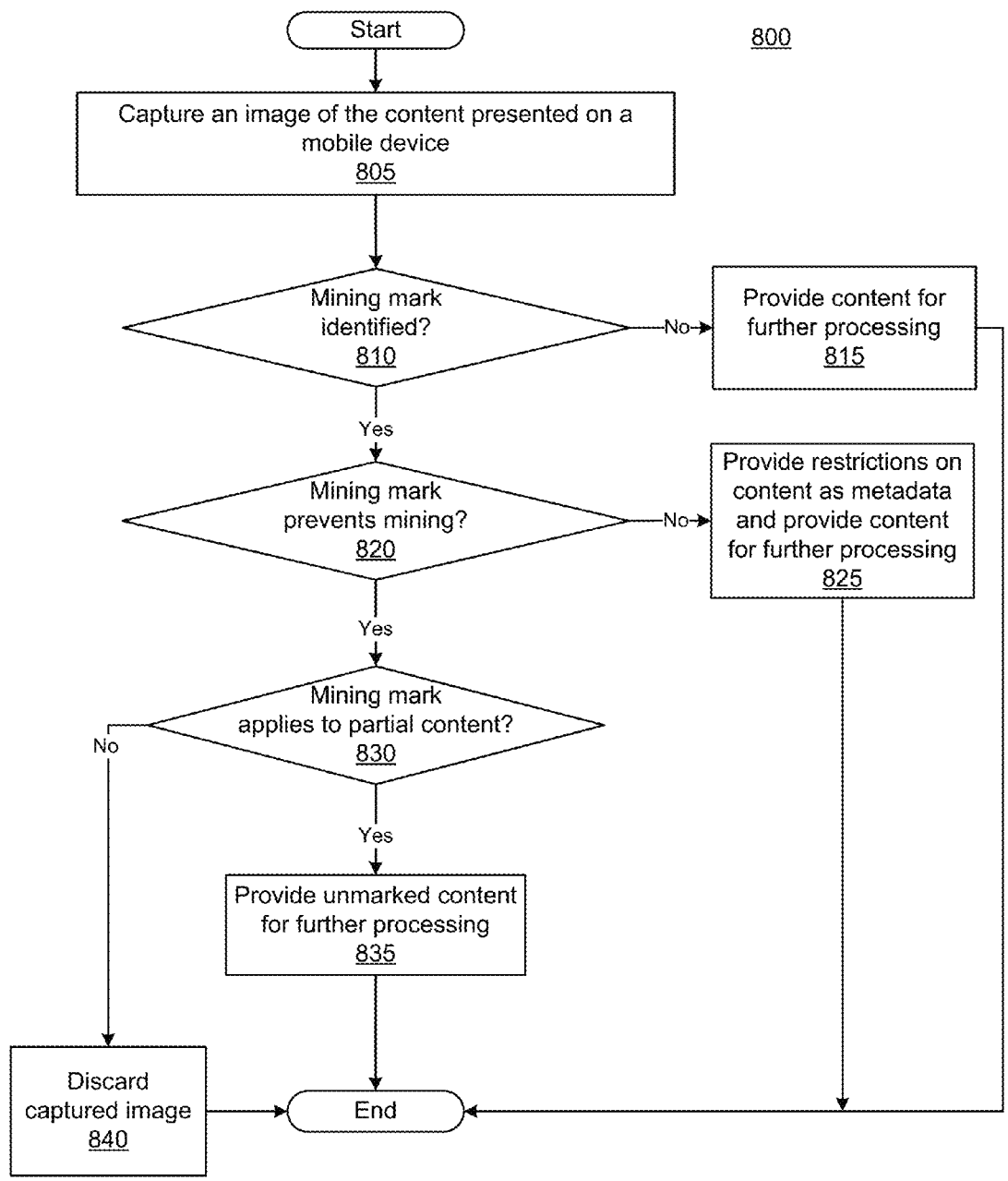
FIG. 8 illustrates a flow diagram of an example process for capturing content presented on a mobile device that respects restrictions represented by mining-restriction marks, in accordance with disclosed implementations.

FIG. 8 illustrates a flow diagram of an example process 800 for capturing content presented on a mobile device that respects restrictions represented by mining-restriction marks, in accordance with disclosed implementations. Process 800 may be performed by a content agent executing on a mobile device, such as content agent 120 of system 100 of FIG. 1. Process 800 may be used to identify content that is not to be provided for further processing and to identify content that is provided for further processing but with one or more restrictions. Process 800 may begin by the content agent capturing content presented on the mobile device (805). Content may include an image of the display or audio playing on speakers. The captured image may be obtained using conventional techniques, such as reading or copying the frame buffer. Audio may be captured by reading from audio sent to a playback device via an audio output buffer. In some implementations, the content agent may perform recognition on the image of the captured screen, for example character recognition, image recognition, logo recognition, etc. Thus, the content agent may identify words, pictures, locations, landmarks, logos, etc. The content agent may look for a mining-restriction mark in the content (810). In some implementations, the content agent may look in the high order or low order bits of the frame buffer for a mining-restriction mark. In some implementations, the content agent may identify the mining-restriction mark as part of the recognition. For example, the content agent may identify a watermark in the image and identify the location of the watermark in the image. As another example, the content agent may identify shapes having a pre-determined border format that indicates the shape is a mining-restriction mark. In another implementation, the content agent may detect a pattern in an audio file occurring at a frequency inaudible by humans. In another implementation, the content agent may detect small changes to the pixels in the audio or video file. In some implementations, the content agent may look for content that corresponds to a mining-restriction trigger, as described below with regard to FIG. 9. For example, the content agent may perform recognition on the content and determine if any of the content corresponds to a mining-restriction trigger. If the content agent finds content that corresponds to a mining-restriction trigger, the mining-restriction mark may be implied (e.g., 810, Yes).

If the content agent fails to locate a mining-restriction mark (810, No), the content agent may continue to process the content or provide the content for further processing (815). For example, if the content agent has not already performed recognition, it may perform recognition on the content. If recognition has already been performed, the content agent, or another agent, module, or engine, may begin analysis of the content, for example to identify entities in the content, to index the image via recognized items, to initiate personalized help, etc. Process 800 then ends for this particular captured image.

If the content agent locates a mining-restriction mark (810, Yes), the content agent may determine whether the mining-restriction mark prevents mining (820). For example, the pattern, color, or type of mining-restriction mark may indicate that the protected content cannot be mined or that it can be mined but with restrictions. Non-limiting examples of these restrictions are illustrated in user interface 710 of FIG. 7. The mining-restriction mark can be visible or can be represented by a particular pattern in the low or high order bits of the frame buffer. In some implementations, the mining-restriction mark may be a hash and when the device cannot interpret the hash as its own device identifier, the content agent may consider the mining-restriction mark as preventing mining. If the mining-restriction mark does not prevent mining (820, No), the content agent may provide the restrictions on the marked content as metadata and provide the content for further processing, as discussed above with regard to step 815. If the mining-restriction mark does prevent mining (820, Yes), the content agent may determine whether the mining-restriction mark applies to partial content or the entire image (830). For example, a visible watermark or border may encompass the entire screen, or a pattern found in the low or high order bits of the frame buffer may protect the entire screen, whereas a visible watermark or border may protect less than the entire screen. In some implementations, the mining-restriction mark may protect something by modifying displayed content in a way that is not readily perceptible to the user. For example, the mining-restriction mark may make combinations of tiny changes to characters, spacing, background color, etc. that are virtually imperceptible to a person viewing the display but that the system can easily perceive.

If the mining-restriction mark applies to partial content (830, Yes), the content agent may hold back or obscure the partial content but provide the remaining content for further processing (835). For example, in some implementations, the area of the image protected by the mining-restriction mark may be replaced with all zeros, all ones, or may be discarded. If the content agent has performed recognition on the image, the recognized items in the portion of the screen protected by the mining-restriction mark may be discarded prior to further processing. If the mining-restriction mark applies to the entire image (840, No), the content agent may discard the captured image (840) and any information relating to recognition performed on the captured image. Thus, the content is not provided for further processing. Process 800 then ends, the content agent having complied with the mining restrictions requested by the mobile application that generated the content, the operating system, and/or the user of the computing device.

In some implementations, the content agent may perform a process similar to process 800, but for user input actions. In other words, the content agent may check the mining-restriction triggers to determine whether to capture user input actions and, if user input actions are captured, whether there are any restrictions associated with the user input actions. Thus, like the content mined from the image, user input actions may be captured but may expire, may not be shared, etc.

Figure 9:
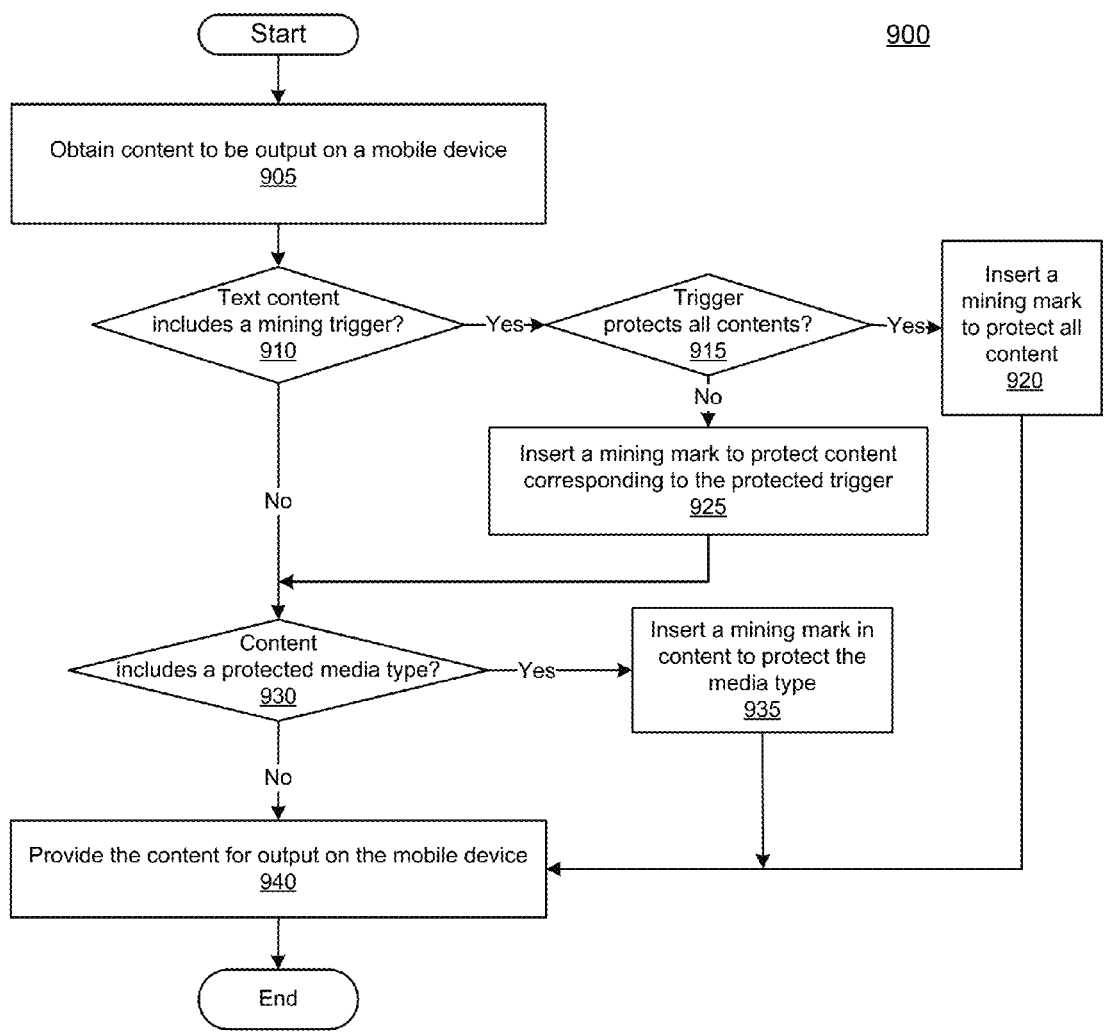
FIG. 9 illustrates a flow diagram of an example process for inserting mining-restriction marks in content output on a mobile device, in accordance with disclosed implementations.

FIG. 9 illustrates a flow diagram of an example process 900 for inserting mining-restriction marks in content presented on a mobile device, in accordance with disclosed implementations. Process 900 may be performed by a mobile application or the operating system running on a mobile computing device, such as device 180 of system 100 of FIG. 1. In this sense, process 900 may be understood to be performed by an application running on the mobile device. Process 900 may be used to include mining-restriction marks in response to mining-restriction triggers in content to be output (e.g., displayed on the screen or played via audio signals) on the mobile device. It is understood, however, that a mobile application or the operating system may include some mining-restriction marks in content to be output that are not related to a mining-restriction trigger. In this sense, the application developer can include the marks and the user may not have the option to turn the inclusion of the marks off, except possibly at install time. Thus, it is understood that some mobile applications may hard-code the inclusion of mining-restriction marks and some may use mining-restriction triggers to provide the user with the opportunity to control the inclusion or exclusion of the marks, and optionally the restrictions.

Process 900 may begin by obtaining content to be output on the mobile device (905). For example, a mobile application may inspect the content just prior to sending the content to the operating system for output on the mobile device. In general, the mobile application generates the content and, therefore, may have access to any text or media to be included in the content. As another example, the operating system may inspect the content from the mobile application prior to converting the content to an image for the frame buffer. The mobile device may determine whether the textual content to be output includes a mining-restriction trigger (910). The mining-restriction trigger may be a word, phrase, n-gram, or text having a particular format, as illustrated by controls 635 of FIG. 6. The mining-restriction trigger may also be a data element, such as a password, user id, etc., as illustrated by controls 625 of FIG. 6. The mobile device may compare the text and the text formatting against saved mining-restriction triggers, for example mining-restriction triggers 130 of FIG. 1, to determine if there is a match. In the case of a data element, the mobile device may compare the text to a template or class type to determine if the trigger matches. In some implementations, the mobile device may use a label for the text to determine whether the text matches a mining-restriction trigger. If the text does include a mining-restriction trigger (910, Yes), the mobile device may determine whether the mining-restriction trigger protects partial content or the entire screen. For example, the mining-restriction trigger may include an indication of whether a portion of the content is protected or not. In some implementations, words, phrases, and n-grams may protect all content output to the mobile device. In some implementations, data elements may protect a portion of the content, e.g., just the text corresponding to the data element or an area of the display related to the data element. If the trigger does protect all the content (915, Yes), the mobile device may insert a mining-restriction mark that protects all content from mining (920). This may be determined by the pattern or color (or both) of the mining-restriction mark. The mining-restriction mark may be inserted as a pattern in the high or low order bits of the content sent to the frame buffer, as a border around the content, or as an opaque image displayed behind the content, or other conventional techniques for inserting watermarks. The mobile device may provide the content for output (940), as all content is protected from mining so there is no need to look for additional mining-restriction triggers. If the trigger does not protect all the content, the mobile device may insert a mining-restriction mark that protects the content corresponding to the matching mining-restriction trigger (925). The mobile device may insert the mining-restriction mark by determining the area corresponding to the text and providing a watermark or border as described above. As another example, the mobile device may insert a rarely used but unobtrusive character around text provided by a user to mark the text as protected.

The mobile device may also determine whether the content includes a media type or mobile application type protected by a mining-restriction trigger (930). For example, the mobile application developer or the user may determine that no pictures, video, or audio should be mined, should only be mined but not shared, can be shared but not mined on the recipient device, etc. Examples of mining-restriction triggers that protect media types are illustrated as controls 620 of FIG. 6. As another example, the operating system may determine that content in a communication application may be protected from mining on a recipient device. If the mobile device determines that the content includes a protected media type or application type (930, Yes), the mobile device may insert a mining-restriction mark in the content that corresponds to the protected media type (935). For example, the mobile device may insert a red border around a picture as an indication that the picture is protected from mining, or can be mined with restrictions. As another example, the mobile device may insert a watermark image or pattern that encompasses an icon that represents an audio file. As another example, the mobile device may make small changes to the pixels of an audio or video file. As another example, the mobile device may add a pattern in an inaudible frequency for an audio file. When the mobile device has inspected the content to be output on the mobile device for content that matches mining-restriction triggers, and inserted any appropriate mining-restriction marks, the mobile device may proceed to provide the content for output (940). Process 900 then ends, with the content including appropriate mining-restriction marks that instruct a content agent how to treat the content.

In some implementations, the content agent may perform part of process 900 and may prevent mining of content without the use of mining-restriction marks. For example, the content agent may perform recognition on a screen capture image and may determine whether any text content includes a mining-restriction trigger, as discussed with regard to step 910. If the content agent finds text corresponding to a mining-restriction trigger, and the trigger protects all contents as described above with regard to step 915, the content agent may terminate any further processing of the screen capture image and any corresponding recognized objects or features. If the trigger does not protect all content, the content agent may determine what the trigger protects (e.g., partial content, or allow mining with restrictions) and may proceed in accordance with any restrictions represented by the mining-restriction trigger.

With regard to process 800 of FIG. 8 and process 900 of FIG. 9, it is understood that the format of the mining-restriction mark and its corresponding level of protection is coordinated between the mobile application developers, the developer of the content agent, and the operating system, so that each component knows which format represents which level of protection. Thus, while the specific format for each level is unimportant, the various formats and their corresponding meaning should be understood by each component. It is also understood that developers of mining applications, such as content agent 120, can self-certify or be-certified as compliant with mining-restriction marks. Such certification may encourage users to use these mining applications, knowing that the mining applications will abide by privacy directives.

FIG. 10 shows an example of a generic computer device 1000, which may be operated as system 100, and/or mobile device 180 of FIG. 1, which may be used with the techniques described here. Computing device 1000 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 1000 includes a processor 1002, memory 1004, a storage device 1006, and expansion ports 1010 connected via an interface 1008. In some implementations, computing device 1000 may include transceiver 1046, communication interface 1044, and a GPS (Global Positioning System) receiver module 1048, among other components, connected via interface 1008. Device 1000 may communicate wirelessly through communication interface 1044, which may include digital signal processing circuitry where necessary. Each of the components 1002, 1004, 1006, 1008, 1010, 1040, 1044, 1046, and 1048 may be mounted on a common motherboard or in other manners as appropriate.

The processor 1002 can process instructions for execution within the computing device 1000, including instructions stored in the memory 1004 or on the storage device 1006 to display graphical information for a GUI on an external input/output device, such as display 1016. Display 1016 may be a monitor or a flat touchscreen display. In some implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk. In some implementations, the memory 1004 may include expansion memory provided through an expansion interface.

The storage device 1006 is capable of providing mass storage for the computing device 1000. In one implementation, the storage device 1006 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 1004, the storage device 1006, or memory on processor 1002.

The interface 1008 may be a high speed controller that manages bandwidth-intensive operations for the computing device 1000 or a low speed controller that manages lower bandwidth-intensive operations, or a combination of such controllers. An external interface 1040 may be provided so as to enable near area communication of device 1000 with other devices. In some implementations, controller 1008 may be coupled to storage device 1006 and expansion port 1014. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1030, or multiple times in a group of such servers. It may also be implemented as part of a rack server system. In addition, it may be implemented in a computing device, such as a laptop computer 1032, personal computer 1034, or tablet/smart phone 1036. An entire system may be made up of multiple computing devices 1000 communicating with each other. Other configurations are possible.

FIG. 11 shows an example of a generic computer device 1100, which may be an example of server 190 of FIG. 1, which may be used with the techniques described here. Computing device 1100 is intended to represent various example forms of large-scale data processing devices, such as servers, blade servers, datacenters, mainframes, and other large-scale computing devices. Computing device 1100 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1100 may include any number of computing devices 1180. Computing devices 1180 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1180a includes multiple racks 1158a-1158n. Each rack may include one or more processors, such as processors 1152a-1152n and 1162a-1162n. The processors may include data processors, network attached storage devices, and other computer controlled devices. In some implementations, one processor may operate as a master processor and control the scheduling and data distribution tasks. Processors may be interconnected through one or more rack switches 1158, and one or more racks may be connected through switch 1178. Switch 1178 may handle communications between multiple connected computing devices 1100.

Each rack may include memory, such as memory 1154 and memory 1164, and storage, such as 1156 and 1166. Storage 1156 and 1166 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1156 or 1166 may be shared between multiple processors, multiple racks, or multiple computing devices and may include a computer-readable medium storing instructions executable by one or more of the processors. Memory 1154 and 1164 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1154 may also be shared between processors 1152a-1152n. Data structures, such as an index, may be stored, for example, across storage 1156 and memory 1154. Computing device 1100 may include other components not shown, such as controllers, buses, input/output devices, communications modules, etc.

An entire system, such as system 100, may be made up of multiple computing devices 1100 communicating with each other. For example, device 1180a may communicate with devices 1180b, 1180c, and 1180d, and these may collectively be known as system 100. As another example, system 100 of FIG. 1 may include one or more computing devices 1100. Some of the computing devices may be located geographically close to each other, and others may be located geographically distant. The layout of system 1100 is an example only and the system may take on other layouts or configurations.

According to certain aspects of the disclosure, a method includes identifying, by a first application running on a mobile device, a mining-restriction mark in frame buffer data from the mobile device, the mining-restriction mark having been inserted by a second application prior to output on the mobile device and determining whether the mining-restriction mark prevents mining of content, wherein mining includes non-transient storage of a copy or derivations of the frame buffer data. The method may also include preventing the mining when the mining-restriction mark prevents mining. When the mining-restriction mark does not prevent mining, the method may include determining a restriction for the data based on the mining-restriction mark and providing the restriction with the data for further processing.

These and other aspects can include one or more of the following features. For example, the restriction may be an expiration date for objects extracted from the data or for the copy of the data. As another example, the restriction may prevent sharing of the copy of the data and the objects extracted from the data, sharing of the copy of the data and the objects extracted from the data after an expiration date, and/or sharing of the copy of the data and the objects extracted from the data prior to a specified date. As another example, the mining-restriction mark can be visible to a user of the mobile device. As another example, the method may also include providing, during an install of the second application, a user interface that requests an indication from a user of the mobile device of whether to insert the mining-restriction mark and receiving the indication from the user that indicates the mining-restriction mark is to be inserted, wherein the second application inserts the mining-restriction mark responsive to receiving the indication.

As another example, the method may also include determining whether the mining-restriction mark prevents mining of a first portion of the data that is less than all the data and providing a remaining portion of the data for mining when the mining-restriction mark prevents mining of the first portion, the remaining portion excluding the first portion. As another example, the method may include determining whether the mining-restriction mark prevents mining of a first portion of the data that is less than all the data and, when the mining-restriction mark prevents mining of the first portion, obscuring the first portion of the content and providing the content for further processing, the content including the obscured first portion. As another example, the restriction may prevent mining on a device that did not generate the content.

According to certain aspects of the disclosure, a method includes determining that content to be displayed on a screen of a mobile device includes content that matches a mining-restriction trigger, inserting a mining-restriction mark in the content that protects at least a portion of the content, and displaying the content, including the inserted mining-restriction mark, on the screen.

These and other aspects can include one or more of the following features. For example, the method may also include receiving, from a user of the mobile device, text, wherein the text is the mining-restriction trigger. As another example, the mining-restriction trigger may be determined by a developer of an application that generated the content. As another example, the method may also include determining that the mining-restriction trigger protects less than all the content, wherein inserting the mining-restriction mark includes positioning the mining-restriction mark so that the portion of the content is encompassed by the mining-restriction mark and remaining content is not. As another example, the method may also include receiving, from a user of the mobile device, an indication of a data element, wherein the data element is the mining-restriction trigger. As another example, the mining-restriction trigger may represent a data element and determining that the content includes content that matches the mining-restriction trigger can include determining that the content includes content that matches a pattern for the data element.

As another example, the mining-restriction trigger may specify a text format and determining that the content includes content that matches the mining-restriction trigger may include determining that the content includes text with the text format. As another example, the mining-restriction trigger can be a media type. As another example, the method may also include identifying, by a content agent, the mining-restriction mark in the content subsequent to display on the screen and disregarding the portion of the content protected by the mining-restriction mark responsive to identifying the mining-restriction mark. As another example, the mining-restriction mark may be visible to a user of the mobile device and may provide an indication of the portion protected. As another example, the portion may represent all of the content. As another example, the mining-restriction mark can include a hash of a device identifier for the mobile device.

According to certain aspects of the disclosure, a mobile device may include at least one processor, a display device, and memory storing instructions that, when executed by the at least one processor, cause the mobile device to perform operations. The operations may include identifying a mining-restriction mark in low order bits or high order bits in a frame buffer of the mobile device, determining whether the mining-restriction mark prevents mining of content, wherein mining includes non-transient storage of a copy or derivations of data in the frame buffer, and preventing the mining of data in the frame buffer when the mining-restriction mark prevents mining.

These and other aspects can include one or more of the following features. For example, the memory may further store instructions that, when executed by the at least one processor, cause the mobile device to perform operations including determining a restriction for the data in the frame buffer based on the mining-restriction mark when the mining-restriction mark does not prevent mining and providing the restriction with the data for further processing. As another example, the memory may further store instructions that, when executed by the at least one processor, cause the mobile device to perform operations including identifying, in content to be sent to the frame buffer, text in the content that matches a mining-restriction trigger, inserting the mining-restriction mark into the content, and providing the content to the frame buffer for display on the display device. As another example, the memory may further store instructions that, when executed by the at least one processor, cause the mobile device to perform operations including determining that the memory stores a mining-restriction trigger that prevents mining of all content, inserting the mining-restriction mark into the content responsive to the determining, and providing the content to the frame buffer for display on the display device.

According to certain aspects of the disclosure, a mobile device may include at least one processor, a display device, and memory storing instructions that, when executed by the at least one processor, generates a user interface. The user interface may be configured to receive a mining-restriction trigger, the mining-restriction trigger being associated by default with a first mining-restriction mark that prevents mining, receive a restriction for the mining-restriction trigger, replace the association of the mining-restriction trigger with the first mining-restriction mark with an associated with a second mining-restriction mark that permits mining with the restriction, and store the mining-restriction trigger associated with the second mining-restriction mark.

These and other aspects can include one or more of the following features. For example, the memory may further store instructions that, when executed by the at least one processor, executes a mobile application. The mobile application may be configured to generate content for display on the display device, determine that the content includes content that matches the mining-restriction trigger, insert the second mining-restriction mark in the content, and provide the content to a frame buffer for display on the display device. In such an implementation, the memory may also store instructions that, when executed by the at least one processor, executes a content agent that is configured to read data from the frame buffer, determine that the data includes the mining-restriction trigger, and prevent, responsive to the determining, the mining of the data. As another example, the memory may also store instructions that, when executed by the at least one processor, executes a content agent configured to capture content displayed on the display device and the user interface may be further configured to receive an indication that disables mining of content and terminate, in response to receiving the indication, the content agent. As another example, the memory may further store instructions that, when executed by the at least one processor, executes a content agent configured to capture content displayed on the display device and the user interface may also be configured to receive an indication that disables mining of content and store the indication as a second mining-restriction trigger. In such an implementation, the memory may further store instructions that, when executed by the at least one processor, causes the mobile device to copy second content for display on the display device to a frame buffer, determine that the second mining-restriction trigger exists, and insert, responsive to the determining, the first mining-restriction mark in the frame buffer, wherein the first mining-restriction mark prevents the content agent from mining the data in the frame buffer. As another example, as part of receiving the mining-restriction trigger, the user interface may further be configured to receive a selection of a portion of content displayed on the display device, receive a label for the portion, and generate the mining-restriction trigger based on the label and the portion of the content selected.

According to certain aspects of the disclosure, a method includes performing recognition, by a first application running on a mobile device, on content generated by a second mobile application and determining that the content includes content matching a mining-restriction trigger. The method also includes determining whether the mining-restriction trigger prevents mining of the content, wherein mining includes storage of a copy or derivations of data in a frame buffer and preventing the mining when the mining-restriction mark prevents mining. The method may also include determining a restriction for the data based on the mining-restriction mark when the mining-restriction mark does not prevent mining and providing the restriction with the data for further processing.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor formed in a substrate, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   inserting a hash of a device identifier for a first mobile device into content generated for display by a mobile application running on the first mobile device;
   transmitting the content with the hash to a second mobile device;
   determining, at the second mobile device, that the content includes the hash;
   determining, at the second mobile device, that the hash is not a hash of a device identifier for the second mobile device; and preventing mining of the content at the second mobile device responsive to determining that the hash is not a hash of the device identifier for the second mobile device, wherein mining includes storage of a copy or derivations of the content.

2. The method of claim 1, wherein the content is content in a frame buffer of the first mobile device.

3. The method of claim 1, further comprising:
identifying, at the second mobile device, a mining-restriction mark in second content generated by a second mobile application executing on the second mobile device;
determining, at the second mobile device, that the mining-restriction mark includes a second hash;
determining, at the second mobile device, that the second hash is a hash of the device identifier for the second mobile device;
determining whether the mining-restriction mark prevents mining of the second content;
preventing the mining when the mining-restriction mark prevents mining; and
providing the second content for further processing at the second mobile device.

4. The method of claim 3, further comprising:
determining a restriction for the second content based on the mining-restriction mark; and
providing the restriction with the second content for further processing.

5. The method of claim 1, further comprising:
identifying, by a second application running on the first mobile device, the hash in the content; and
providing the content for further processing responsive to determining that the hash is a hash of the device identifier for the first mobile device.

6. The method of claim 1, wherein the hash is part of a mining-restriction mark and the method further comprises:
identifying, by a second application running on the first mobile device, the hash in the content;
determining that the hash is a hash of the device identifier for the first mobile device;
determining a restriction for the content based on the mining-restriction mark;
preventing the mining when the restriction prevents mining; and
when the restriction does not prevent mining, providing the restriction with the content for further processing.

7. The method of claim 6, wherein the restriction is an expiration date for objects extracted from the content or for the copy of the content.

8. The method of claim 6, wherein the restriction prevents indexing of the content.

9. A mobile device comprising:
at least one processor;
a display device; and
memory storing instructions that, when executed by the at least one processor, cause the mobile device to perform operations including:
receiving content generated by a mobile application running on a second mobile device for display on the second mobile device,
determining that the content includes a mining-restriction mark, the mining-restriction mark including a hash,
determining that the hash is not a hash of information unique to the mobile device, and
preventing mining of the content responsive to determining that the hash is not a hash of information unique to the mobile device, wherein mining includes non-transitory storage of a copy or derivations of the content.

10. The mobile device of claim 9, wherein the content is content in a frame buffer of the second mobile device.

11. The mobile device of claim 9, wherein the mining-restriction mark is a first mining-restriction mark and the memory further stores instructions that cause the mobile device to perform operations including:
identifying a second mining-restriction mark in second content generated by a mobile application executing on the mobile device;
determining that the second mining-restriction mark includes a second hash;
determining that the second hash is a hash of the information unique to the mobile device; and
providing the second content for further processing at the second mobile device.

12. The mobile device of claim 11, the memory further stores instructions that cause the mobile device to perform operations including:
determining a restriction for the second content based on the second mining-restriction mark; and
providing the restriction with the second content for further processing.

13. The mobile device of claim 12, wherein the restriction is an expiration date for objects extracted from the second content or for the copy of the second content.

14. The mobile device of claim 12, wherein the restriction prevents indexing of the content.

15. The mobile device of claim 9, wherein the mining-restriction mark is a first mining-restriction mark and the memory further stores instructions that cause the mobile device to perform operations including:
identifying a second mining-restriction mark in second content generated by a mobile application executing on the mobile device;
determining that the second mining-restriction mark includes a second hash;
determining that the second hash is a hash of the information unique to the mobile device;
determining whether the second mining-restriction mark prevents mining of the second content;
preventing the mining when the second mining-restriction mark prevents mining; and
providing the second content for further processing at the second mobile device when the mining-restriction mark prevents mining.

16. The mobile device of claim 9, wherein the information unique to the mobile device is a device identifier.

17. The mobile device of claim 9, wherein the information unique to the mobile device is a timestamp for a most recent power-up.

18. A mobile device comprising:
at least one processor;
a display device; and
memory storing instructions that, when executed by the at least one processor, cause the mobile device to perform operations including:
inserting a hash of information unique to the mobile device into content generated for display by a mobile application running on the mobile device, and
transmitting the content with the hash to a second mobile device,
wherein the second mobile device prevents mining of the content responsive to determining that the content includes the hash and that the hash is not a hash of information unique to the second mobile device, wherein mining includes storage of a non-transitory copy or derivations of the content.

19. The mobile device of claim 18, the memory further storing instructions that, when executed by the at least one processor, cause the mobile device to perform operations including:
- identifying, by a second application running on the mobile device, the hash in the content; and
- providing the content for further processing responsive to determining that the hash is a hash of the information unique to the mobile device.

20. The mobile device of claim 18, wherein the hash is part of a mining-restriction mark and the memory further stores instructions that, when executed by the at least one processor, cause the mobile device to perform operations including:
- identifying, by a second application running on the mobile device, the hash in the content;
- determining that the hash is a hash of the information unique to the mobile device;
- determining a restriction for the content based on the mining-restriction mark;
- preventing the mining when the restriction prevents mining; and
- when the restriction does not prevent mining, providing the restriction with the content for further processing.

* * * * *